United States Patent
Schilder et al.

(10) Patent No.: US 9,583,802 B2
(45) Date of Patent: Feb. 28, 2017

(54) BATTERY HUMIDITY CONTROL BY DIFFUSION BARRIER

(71) Applicant: GM GLOBAL TECHNOLOGY OPERATIONS LLC, Detroit, MI (US)

(72) Inventors: Boris Schilder, Frankfurt am Main (DE); Andreas Mueller, Roβdorf (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 101 days.

(21) Appl. No.: 14/563,800

(22) Filed: Dec. 8, 2014

(65) Prior Publication Data

US 2016/0164150 A1 Jun. 9, 2016

(51) Int. Cl.

| | |
|---|---|
| H01M 8/04 | (2016.01) |
| H01M 10/6567 | (2014.01) |
| H01M 10/613 | (2014.01) |
| H01M 10/625 | (2014.01) |
| H01M 10/6561 | (2014.01) |
| H01M 10/0525 | (2010.01) |
| H01M 10/63 | (2014.01) |

(52) U.S. Cl.
CPC ....... *H01M 10/6567* (2015.04); *H01M 10/613* (2015.04); *H01M 10/625* (2015.04); *H01M 10/6561* (2015.04); H01M 10/0525 (2013.01); H01M 10/63 (2015.04); H01M 2220/20 (2013.01)

(58) Field of Classification Search
CPC ..................... H01M 8/04164; H01M 8/04007
See application file for complete search history.

(56) References Cited

U.S. PATENT DOCUMENTS 4,194,041 A * 3/1980 Gore ................. B32B 27/08
2/135

FOREIGN PATENT DOCUMENTS

WO WO2012178205 * 12/2012

* cited by examiner

*Primary Examiner* — Stewart Fraser
*Assistant Examiner* — Olatunji Godo
(74) *Attorney, Agent, or Firm* — Phillips Ryther & Winchester; Jared L. Cherry

(57) ABSTRACT

Disclosed herein are various systems and methods for controlling humidity in batteries to reduce formation of condensate in a battery compartment. In one embodiment, a system consistent with the present disclosure may include a cooling system configured to produce a flow of coolant. A battery compartment may house a battery and may separate the battery from an environment. The flow of coolant may pass into the battery compartment and may be used to cool the battery. The battery compartment may include a vent configured to permit a flow of environmental air to enter the battery compartment. A diffusion barrier may be in fluid communication with the vent and configured to deliver the flow of environment air to the battery compartment. The diffusion barrier may decrease diffusion of water vapor from the environment into the battery compartment.

13 Claims, 5 Drawing Sheets

BATTERY HUMIDITY CONTROL BY DIFFUSION BARRIER

TECHNICAL FIELD

This disclosure relates to systems and methods to control humidity in a battery compartment by providing a diffusion barrier between a battery compartment and an environment from which water vapor may diffuse into the battery.

BACKGROUND

Passenger vehicles often include electric batteries for operating a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like). Further, the HV battery system may power a compressor and/or a heater used in a climate control system for a vehicle cabin.

Various battery systems may include vents that allow ambient air to enter portions of a battery system. In some embodiments, the vent may permit air to enter or exit the battery system and maintain a pressure balance between the battery and the environment. Water carried by the ambient air may condense within the battery system. Condensate inside the battery system may cause corrosion and/or problems with electrical circuits in the battery system. Corrosion and/or electrical problems created by condensate may result in battery system inefficiencies, degradation, permanent damage and/or a shortened usable lifespan of the battery system.

SUMMARY

The present disclosure relates to controlling humidity in a battery compartment by providing a diffusion barrier between a battery compartment and an environment from which water vapor may diffuse into the battery compartment. In some instances, even without a flow of air, water vapor may enter the battery due to diffusion (i.e., a difference in vapor concentration inside and outside of a battery compartment).

The battery compartment may house a battery and may receive the flow of coolant. The flow of coolant may cool the battery. The cooling system may maintain a temperature in the battery compartment. In some embodiments, the battery may comprise a lithium-ion battery or other type of battery.

Some embodiments may include a vent configured to permit air from an environment to enter a battery compartment. In some embodiments, a membrane may be disposed over the vent. The membrane may be permeable to air and/or water, but may prevent debris and/or other foreign objects from entering the battery compartment.

Air passing into the interior of the battery may carry water vapor from the environment. The quantity of vapor transported into the interior of the battery may depend on diffusion resistance. Consistent with various embodiments, a diffusion barrier may increase the diffusion resistance between the environment and the interior of the battery. In some embodiments, the diffusion barrier may comprise a length of tubing or other structure configured to increase the diffusion resistance between the environment and the interior of the battery.

In one specific embodiment, a system consistent with the present disclosure may include a cooling system configured to produce a flow of coolant. A battery compartment may house a battery and may separate the battery from an environment. The flow of coolant may pass into the battery compartment and may be used to cool the battery. In some embodiments, the coolant may be a liquid coolant. The battery compartment may include a vent configured to permit a flow of environmental air to enter the battery compartment. The flow of air may be generated by a pressure difference between the environment and the battery compartment or by other changes in the environment in which the battery is operated.

A diffusion barrier may be in fluid communication with the vent and configured to deliver the flow of environment air to the battery compartment. The diffusion barrier may decrease diffusion of water vapor from the environment into the battery compartment. The diffusion barrier may be impermeable to air and/or liquid along its length.

In certain embodiments, an air-permeable membrane may be at least partially disposed over the vent and disposed between the battery compartment and the environment. The air permeable membrane configured to permit the flow of environmental air to pass and to at least partially prevent solid objects from entering into the battery compartment. The air-permeable membrane may be impermeable to liquids. A diffusion resistance of the diffusion barrier may be greater than a diffusion resistance of the membrane. In some embodiments, the flow of environmental air may pass through the diffusion barrier prior to passing through the membrane. In other embodiments, the flow of environmental air may pass through the membrane prior to passing through the diffusion barrier. Further, the system may be configured such that the air-permeable membrane is disposed at a boundary between the environment and the diffusion barrier, or the system may be configured such that the air-permeable membrane is disposed at a boundary between the diffusion barrier and the battery compartment.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of certain embodiments, as generally described and illustrated in the figures herein, could be arranged and designed in a wide variety of different configurations.

Figure 1:
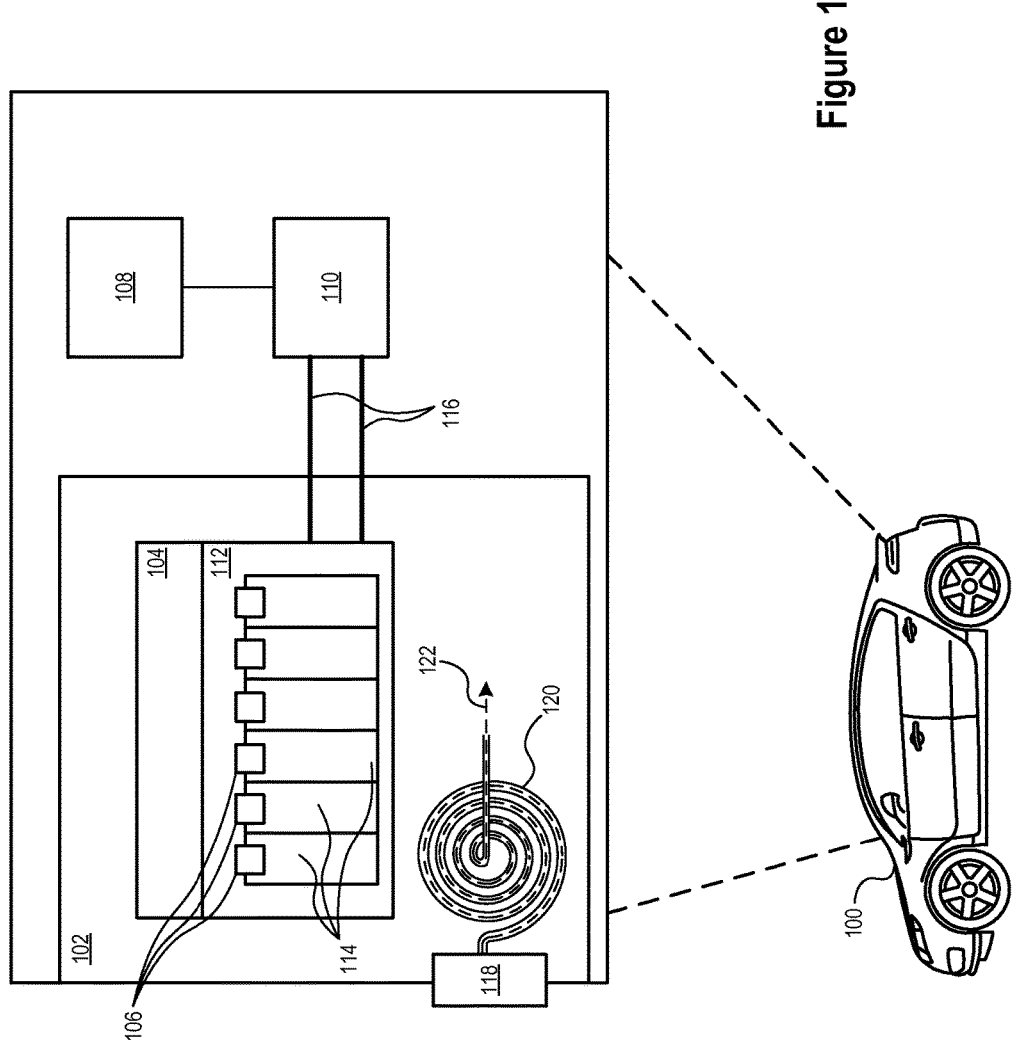
FIG. 1 illustrates a block diagram of an exemplary battery system in a vehicle consistent with the present disclosure.

FIG. 1 illustrates a block diagram of an exemplary battery system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system) and a vehicle cabin climate control system, which may include a heater and/or compressor. In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like. Still further, in some embodiments the battery system may be configured to operate in mild-hybrid applications and may have a mid-range voltage (e.g., about 42 volts).

A cooling system 110 may be configured to generate a flow of coolant (e.g. water-glycol, dielectric liquid, refrigerant, air) that is used to maintain a temperature of the battery system 102 within a specified range. The cooling system 110 may be in fluid communication with the battery system 102 through one or more coolant lines 116. In certain embodiments, a coolant may absorb heat from battery system 102 as it flows through the battery system 102. The heated coolant may flow back to the cooling system 110, where the heat absorbed by the coolant may be transferred to the environment.

The battery system 102 may include a battery control system 104. The battery control system 104 may be configured to monitor and control certain operations of the battery system 102. For example, the battery control system 104 may be configured to monitor and control charging and discharging operations of the battery system 102. In certain embodiments, the battery control system 104 may be communicatively coupled with one or more sensors 106 (e.g., voltage sensors, current sensors, temperature sensors, humidity sensors and/or the like, etc.) and/or other systems configured to enable the battery control system 104 to monitor and control operations of the battery system 102.

Information from sensors 106 may be used by the control system 104 to operate the cooling system 110 to condition air from the environment that flows into the battery system 102. Temperature and/or humidity sensors 106 may provide data to the battery control system 104, which in turn may be configured to monitor the humidity within battery system 102 and to appropriately operate the cooling system 110 to dehumidify environmental air entering the battery system 102 to prevent condensation within the battery system 102.

The battery control system 104 may further be configured to provide information to and/or receive information from other systems included in the vehicle 100. For example, the battery control system 104 may be communicatively coupled with an internal vehicle computer system 108 and/or the cooling system 110. In certain embodiments, the battery control system 104 may be configured, at least in part, to provide information regarding the battery system 102 to a user of the vehicle 100, vehicle computer system 108, and/or the cooling system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more subdivisions 114. The subdivisions 114 may comprise subpacks, each of which may comprise one or more battery cells utilizing any suitable battery technology. Suitable battery technologies may include, for example, lead-acid, nickel-metal hydride, lithium-ion, Li-Ion polymer, lithium-air, nickel-cadmium, valve-regulated lead-acid including absorbed glass mat, nickel-zinc, molten salt (e.g., a ZEBRA battery), nickel manganese cobalt, lithium iron phosphate, lithium manganese oxide, and/or other suitable battery technologies and combinations thereof (e.g., mixed-chemistry battery technologies).

Each subdivision 114 may be associated with a sensor 106 configured to measure one or more parameters (e.g., voltage, current, impedance, temperature, etc.) associated with each battery subdivision 114. Although FIG. 1 illustrates separate sensors 106 associated with each battery section 114, in some embodiments a sensor configured to measure various parameters associated with a plurality of subdivisions 114 may also be utilized. The parameters measured by sensor 106 may be provided to battery control system 104. Using the electrical parameters, battery control system 104 and/or any other suitable system may coordinate the operation of battery system 102.

In one specific embodiment, the battery system 102 may comprise a Li-Ion battery configured to operate at a temperature of less than 35° C. As battery technology evolves, higher temperature ranges may become practicable for Li-Ion battery systems. For example, it is contemplated that certain embodiments may be configured to operate at a temperature higher than 35° C.

An aperture 118 may be configured to permit ambient air 122 to circulate within battery system 102. In some embodiments, the aperture 118 may be covered by an air-permeable (not shown) membrane. A diffusion barrier 120 may be disposed between the aperture 118 and the interior of the battery system 102. As discussed in greater detail in FIG. 2, a diffusion barrier 120 may reduce the flow of water vapor into the interior of battery system 102 to reduce or eliminate formation of condensate in the battery system 102.

Figure 2A:
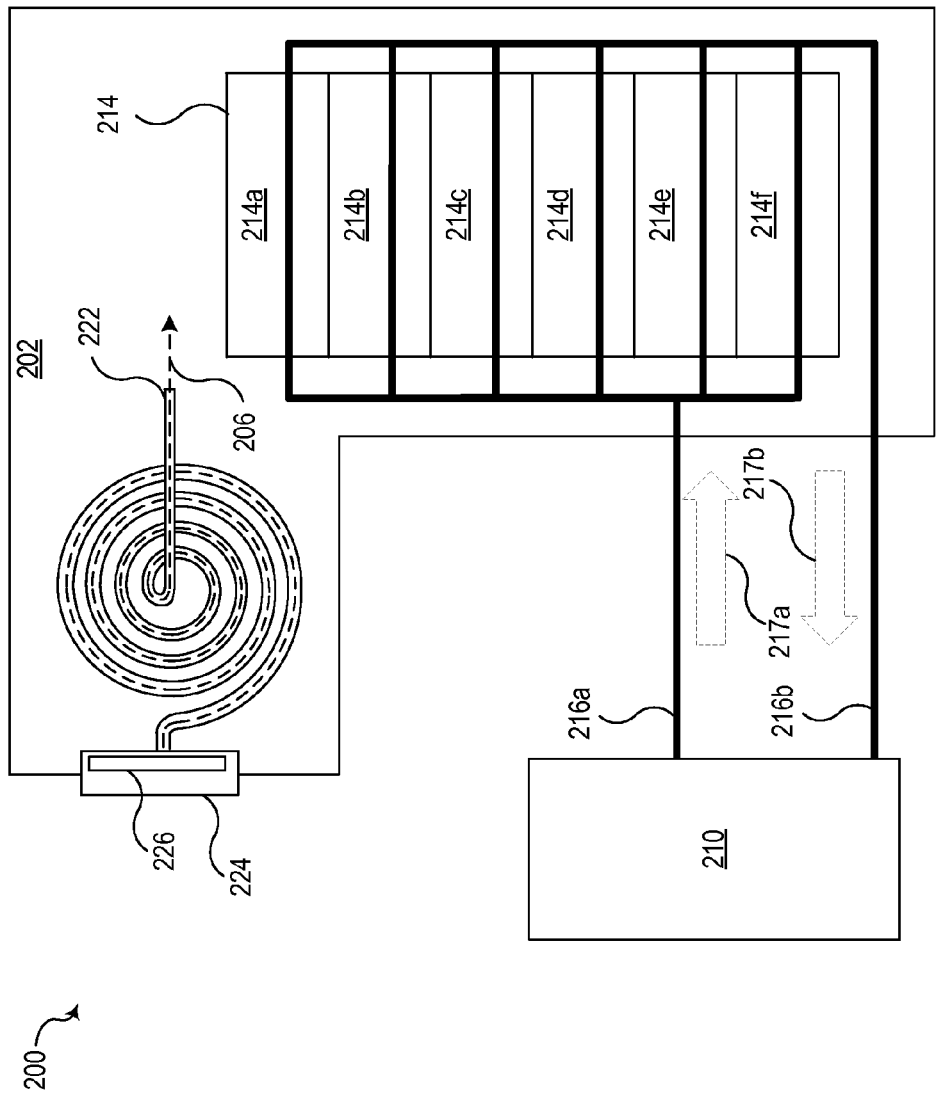
FIG. 2A illustrates a functional block diagram of a system including a spiral-shaped diffusion barrier consistent with the present disclosure.

FIG. 2A illustrates a functional block diagram of a system 200 including a spiral diffusion barrier 222 consistent with the present disclosure. A battery compartment 202 may house a battery 214 including a plurality of battery subdivisions 214a-214f electrically arranged in series or parallel. In some embodiments, battery subdivisions 214a-214f may each include a plurality of battery cells. A cooling system 210 may provide a closed-loop path through which coolant may flow through system 200. A temperature of a battery 214 may be maintained within a temperature range by controlling the flow of coolant delivered to the battery 214 by the cooling system 210.

Coolant may flow to system 200 through coolant line 216a (as indicated by arrow 217a) and may flow from system 200 through coolant line 216b (as indicated by arrow 217b). In the illustrated embodiment, coolant line 216a branches in battery compartment 202 and flows in a plurality of parallel channels through the plurality of battery subdivisions 214a-214f. In alternative embodiments, coolant may flow serially through the plurality of battery subdivisions 214a-214f. Further, in alternative embodiments, the direction of the flow of coolant may be reversed (i.e., the direction of the arrows 217a, 217b may be reversed).

In some embodiments the system 200 may utilize a low coolant temperature thermal architecture. In such embodiments, the cooling system 210 may provide a flow of refrigerant. The flow of refrigerant may cool, either directly or indirectly, the plurality of battery subdivisions 214a-214f. The use of a diffusion barrier consistent with embodiments of the present disclosure may enable or improve the utilization of low coolant temperature thermal architectures.

Ambient air 206 may enter the battery compartment 202 through an aperture 224. In some embodiments, ambient air 206 may flow into and out of the battery compartment 202 passively (e.g., by convection) or may be circulated using active components (e.g., a fan). In various embodiments, a membrane 226 may be partially or fully disposed across the aperture 224. The membrane 226, in some embodiments, may comprise an air-permeable and/or liquid-permeable membrane. In other embodiments, the aperture 224 may be replaced by a porous material that is configured to permit the flow of ambient air 206 to enter the battery compartment 202.

The diffusion barrier 222 may be disposed between the permeable membrane 226 and the interior of battery compartment 202. In the illustrated embodiment, the diffusion barrier may comprise a length of tubing in fluid communication with the permeable membrane 226. The material from which the diffusion barrier 222 is formed may be impermeable to air. Accordingly, air may only enter the diffusion barrier 222 at a first end and exit the diffusion barrier 222 at the second end. In alternative embodiments, the diffusion barrier may comprise a variety of elongate structures formed of a variety of materials. For example, the diffusion barrier may be formed of any material that is substantially impermeable to diffusion of air. In various embodiments, the material may include, a variety of plastics, metal, ceramics, and the like. In one specific embodiment, the diffusion barrier may comprise polycarbonate.

Figure 2B:
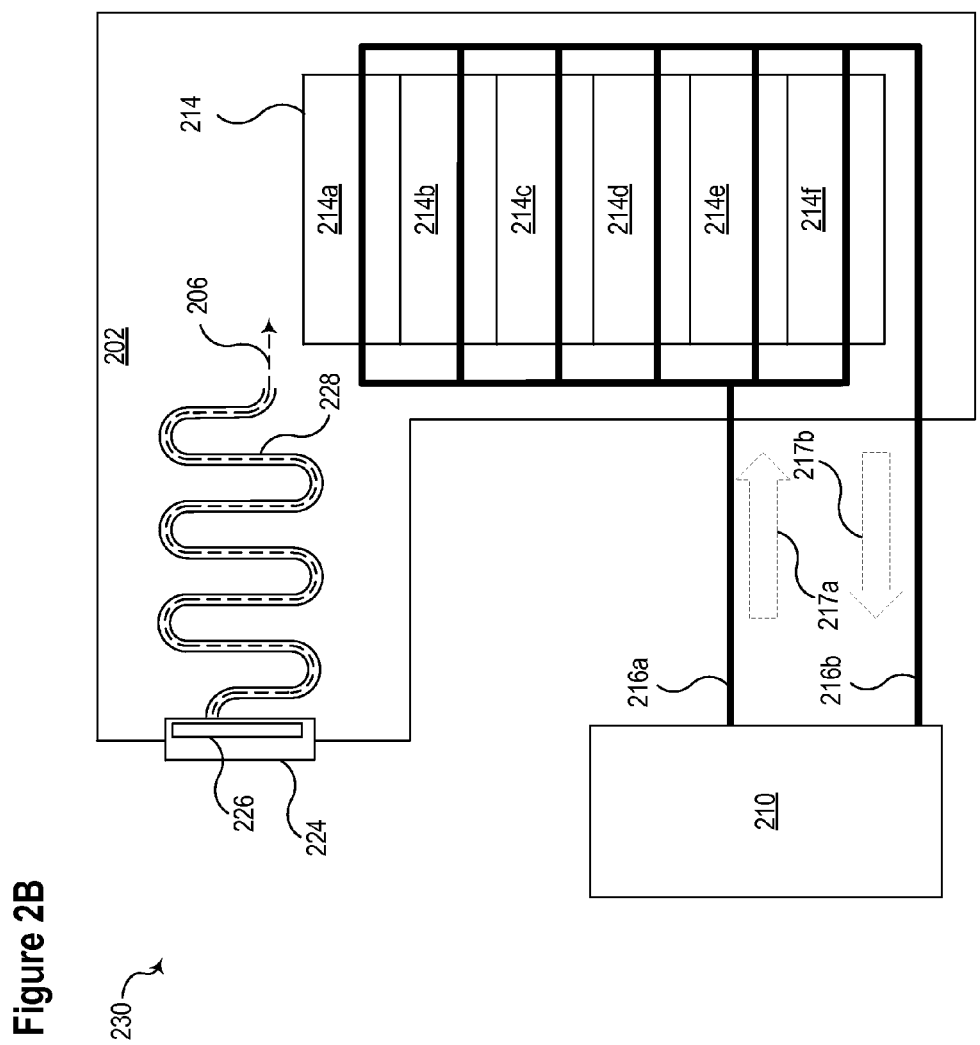
FIG. 2B illustrates a functional block diagram of the system illustrated in FIG. 2A including a serpentine diffusion barrier.

FIG. 2B illustrates a functional block diagram of a system 230, which is similar to system 200 illustrated in FIG. 2A and including a serpentine diffusion barrier 228. The system 230 may operate in a similar manner to system 200, described in FIG. 2A. Specifically, the flow of ambient air 206 may enter the battery compartment 202 through an aperture 224, may pass through the membrane 226, and may enter the serpentine diffusion barrier 228.

Figure 2C:
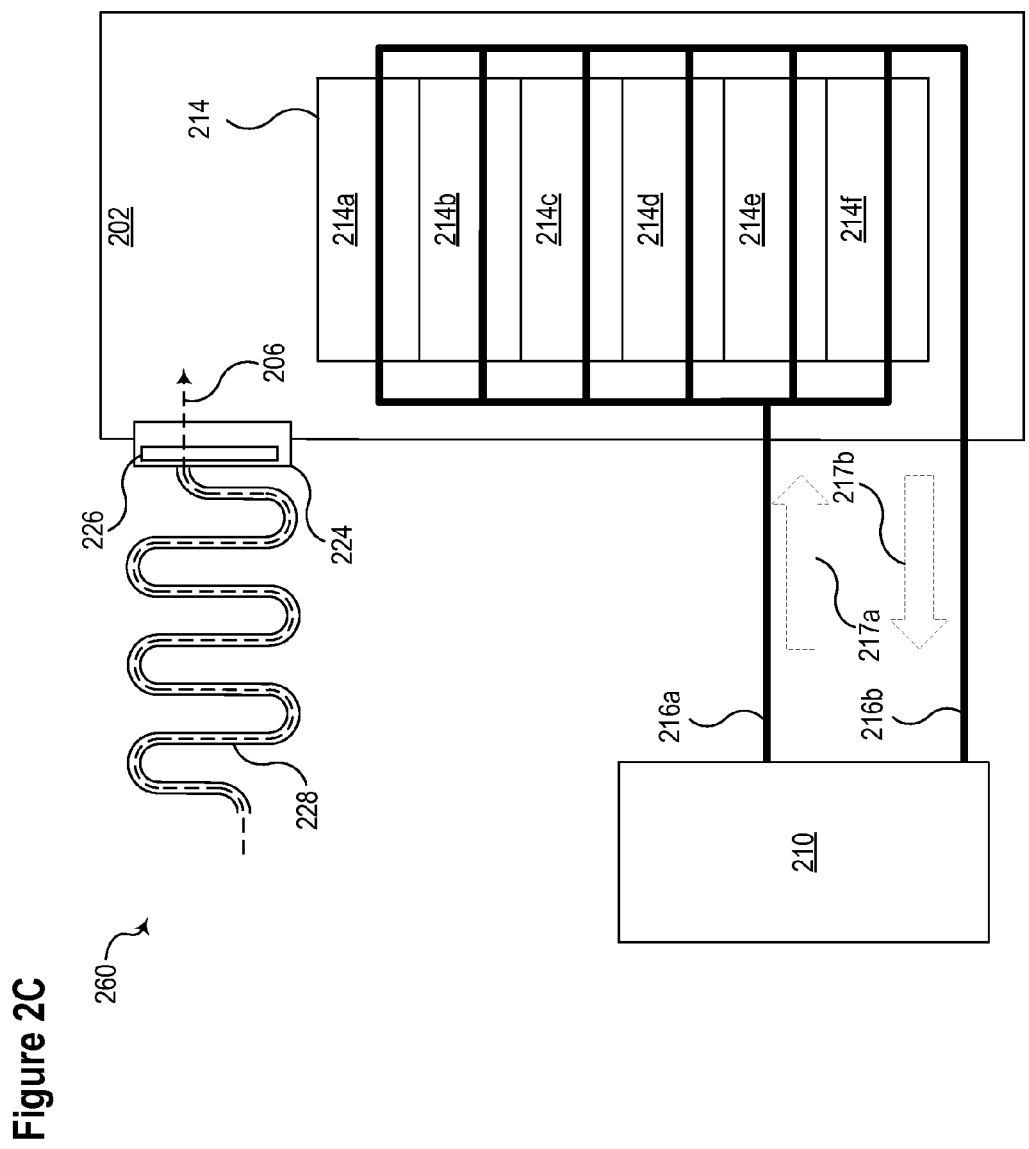
FIG. 2C illustrates a functional block diagram of the system illustrated in FIG. 2B in which the diffusion barrier is disposed outside of a battery compartment consistent with the present disclosure.

FIG. 2C illustrates a functional block diagram of a system 260, which is similar to system 200 illustrated in FIG. 2A, in which the diffusion barrier 228 is disposed outside of a battery compartment 202 consistent with the present disclosure. As illustrated in FIG. 2C, in some embodiments the flow of ambient air 206 may first pass through the diffusion barrier 228 before passing through a membrane 226 and the aperture 224.

In FIG. 2A, FIG. 2B, and FIG. 2C the membranes and the diffusion barriers may each exhibit a diffusion resistance, which is designated herein as $R_{Membrane}$ and $R_{Barrier}$. A mass flow rate, which is designated herein as $\dot{m}_{Water}$, transferred from the environment surrounding the battery compartment may be expressed using Eq. 1

$$\dot{m}_{Water} = \frac{\text{Vapor Concentration}}{R_{Membrane} + R_{Barrier}} \quad \text{Eq. 1}$$

The Vapor Concentration may be an environmental parameter that is determined by factors such as the temperature and humidity in which the system is operated. Accordingly, a system consistent with the present disclosure may have little control over this parameter; however, by selecting a membrane and diffusion barrier with an appropriate diffusion resistance, the quantity of water transported into the battery compartment may be reduced. In some embodiments, the diffusion resistance of the diffusion barrier may be much greater than the diffusion resistance of the membrane (i.e., $R_{Barrier} >> R_{Membrane}$).

In various embodiments, the value of $R_{Barrier}$ may be controlled in a variety of ways. Specifically, different materials may be used to form the diffusion barrier that exhibit different diffusion resistance values; different configurations of the diffusion barrier may be utilized (e.g., spiral, serpentine, etc.); different sizes of the diffusion barrier may be utilized (e.g., the cross sectional area of the diffusion barrier, the length of the diffusion barrier, etc.) By varying these and other parameters, a desired balance may be achieved between permitting a flow of ambient air to enter the battery chamber and limiting the potential for accumulation of condensate in the battery chamber.

Figure 3:
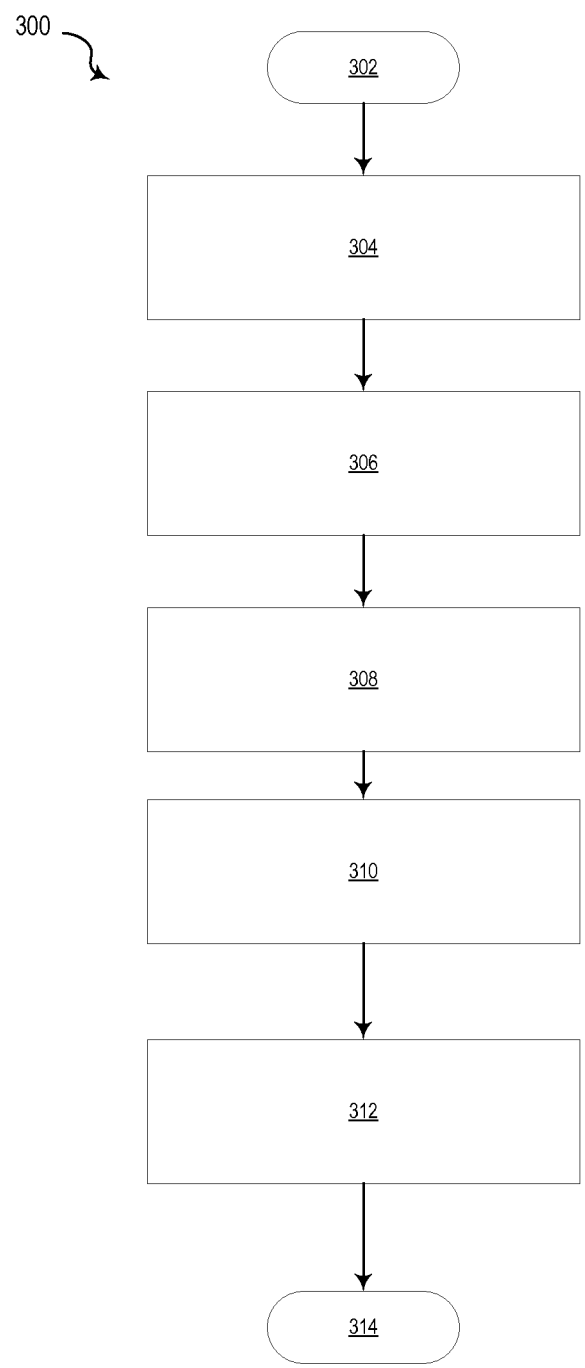
FIG. 3 illustrates a flow chart of a method of operating a battery system including a diffusion barrier consistent with the present disclosure.

FIG. 3 illustrates a flow chart of a method 300 of operating a battery system including a diffusion barrier consistent with the present disclosure. Method 300 may begin at 302. At 304, a battery system including a diffusion barrier may be provided. In some embodiments, the battery system including a diffusion barrier may be similar to the battery system described above and illustrated in connection with FIG. 2.

At 306, ambient air may pass through an air-permeable membrane. In some embodiments, the ambient air may enter the air-permeable membrane, using, for example, a pressure difference between the environment and the battery compartment. The pressure difference may be attributable to a difference in temperature between the battery compartment and the environment. The difference in pressure may cause air to flow from the environment into or out of the battery compartment. Further, air flow may be induced by changes in atmospheric pressure as a vehicle's elevation increases or decreases. For example, as the elevation of a vehicle decreases, the atmospheric pressure increases. As a result of the increased atmospheric pressure, air may flow into the battery compartment. The same process may occur in reverse as the elevation of a vehicle increases. In various embodiments, the flow of ambient air may be generated passively, while in other embodiments, the flow of ambient air may be generated actively using an air circulation device (e.g., a fan).

At 308, the ambient air may pass through a diffusion barrier. In various embodiments, the diffusion barrier may be disposed between the air-permeable membrane and the interior of the battery compartment. In various embodiments, the diffusion barrier may be disposed in a variety of configurations. Three specific configurations are illustrated in FIG. 2A, FIG. 2B; and FIG. 2C however, a variety of alternate configurations are also contemplated.

Returning to a discussion of FIG. 3, at 310, the ambient air may exit the diffusion barrier and may be introduced into the battery compartment. In some embodiments, the diffusion barrier may be disposed entirely or partially within the battery compartment (e.g., as illustrated in FIG. 2A and FIG. 2B). In other embodiments, the diffusion barrier may be disposed entirely or partially outside of the battery compartment (e.g., as illustrated in FIG. 2C). Further, FIG. 2A and FIG. 2B illustrate an embodiment in which the ambient air passes through the air-permeable membrane prior to passing through the diffusion barrier. In FIG. 2C, the air-permeable membrane may be disposed such that the flow of ambient air passes through the diffusion barrier prior to passing through the air-permeable membrane as the flow of air moves toward the battery compartment. The flow of air may be generated by changes in the environment in which the vehicle operates (e.g., changes in elevation, changes in temperature, etc.).

At 312, a flow of coolant may cool a battery housed in the battery compartment. In various embodiments, the flow of coolant may be configured to maintain the battery temperature within a predetermined range. In one specific embodiment, the flow of coolant may be configured similar to what is shown in FIG. 2A and FIG. 2B. Method 300 may end at 314.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to reduce formation of condensate in a battery compartment, the system comprising:
    a cooling system configured to produce a flow of coolant;
    a battery compartment configured to house a battery and to separate the battery from an environment and further configured to receive the flow of coolant, the flow of coolant operable to cool the battery;
    a vent in the battery compartment configured to permit a flow of environmental air to enter the battery compartment;
    a diffusion barrier in fluid communication with the vent and configured to deliver the flow of environment air to the battery compartment, the diffusion barrier further configured to decrease diffusion of water vapor from the environment into the battery compartment.

2. The system of claim 1, further comprising:
    an air-permeable membrane at least partially disposed over the vent and disposed between the battery compartment and the environment, the air permeable membrane configured to permit the flow of environmental air to pass and to at least partially prevent solid objects from entering into the battery compartment.

3. The system of claim 2, wherein a diffusion resistance of the diffusion barrier exceeds a diffusion resistance of the air-permeable membrane.

4. The system of claim 2, wherein the flow of air passes through the diffusion barrier prior to passing through the air-permeable membrane.

5. The system of claim 2, wherein the air-permeable membrane is impermeable to liquid.

6. The system of claim 2, wherein the air-permeable membrane is disposed at a boundary between the environment and the diffusion barrier.

7. The system of claim 2, wherein the air-permeable membrane is disposed at a boundary between the diffusion barrier and the battery compartment.

8. The system of claim 1, wherein the diffusion barrier comprises an elongate structure in fluid communication with the air-permeable membrane.

9. The system of claim 1, wherein the diffusion barrier is impermeable to air and liquid along a length.

10. The system of claim 1, wherein the flow of ambient air is generated by a pressure difference between the environment and the battery compartment.

11. The system of claim 1, wherein the battery comprises a lithium-ion battery.

12. The system of claim 1, wherein the coolant system comprises a refrigerant cooling system.

13. A system to reduce formation of condensate in a battery compartment, the system comprising:
    a refrigerant cooling system configured to produce a flow of coolant;
    a battery compartment configured to house a battery and to separate the battery from an environment and further configured to receive the flow of coolant, the flow of coolant operable to cool the battery;
    a vent in the battery compartment configured to permit a flow of environmental air to enter the battery compartment to equalize a pressure in the battery compartment and the environment;
    an air-permeable and liquid impermeable membrane at least partially disposed over the vent and disposed between the battery compartment and the environment, the air permeable membrane configured to permit the flow of environmental air to pass and to at least partially prevent solid objects from entering into the battery compartment;
    an elongate diffusion barrier in fluid communication with the vent and configured to deliver the flow of environment air to the battery compartment, the diffusion barrier further configured to decrease diffusion of water vapor from the environment into the battery compartment.

* * * * *